United States Patent

Mitchell et al.

[15] 3,665,773

[45] May 30, 1972

[54] TRANSMISSION MEANS SUCH AS SPINDLE TAPES

[72] Inventors: Thomas Mitchell, Manchester, England; Frederick Grossman, deceased, late of Manchester, England by Doris Hindes, administrator

[73] Assignee: William Kenyon & Sons Limited

[22] Filed: Aug. 13, 1968

[21] Appl. No.: 753,846

Related U.S. Application Data

[63] Continuation-in-part of Ser. No. 447,943, Apr. 12, 1965, abandoned, Continuation-in-part of Ser. No. 561,287, June 28, 1966, abandoned.

[30] Foreign Application Priority Data

Jan. 6, 1968    Great Britain............................935/68

[52] U.S. Cl. ......................74/231 R, 74/231 P, 117/138.8 F, 117/138.8 N, 117/145, 117/161 P, 117/161 UC, 117/161 UN, 156/304, 156/306, 156/309, 161/88, 161/92, 161/227, 161/228, 161/249, 161/252, 161/254

[51] Int. Cl. ....................................B32b 27/08, B32b 27/34
[58] Field of Search..................161/227, 228, 247, 249, 252, 161/254, 190, 82, 88, 92; 74/231, 232; 117/138.8 F, 138.8 N, 145, 161 P, 161 UH, 161 UC, 161 UN; 260/857, 86.1; 28/75

[56] References Cited

UNITED STATES PATENTS

| 2,292,442 | 8/1942 | Hanford | 260/43 |
| 3,122,934 | 3/1964 | Fihe | 161/249 |
| 3,137,589 | 6/1964 | Reinhard et al. | 161/227 |
| 3,274,289 | 9/1966 | Murdock et al. | 260/857 |

*Primary Examiner*—Robert F. Burnett
*Assistant Examiner*—George W. Moxon, II
*Attorney*—Bailey & Dority

[57] ABSTRACT

A transmission tape comprising a woven fabric the constituent yarns of which are selected from the group consisting of natural cellulose and nylon and mixtures of polyethylene terephthalate and cotton have been impregnated with an alkyl acrylate polymer and nylon of low melting point.

9 Claims, No Drawings

TRANSMISSION MEANS SUCH AS SPINDLE TAPES

This application is a continuation-in-part of application Ser. No. 447,943, filed Apr. 12, 1965, and of application Ser. No. 561,287, filed June 28, 1966 now abandoned.

This invention is concerned with the production of flexible transmission means based on textile material, for example spindle tapes for use in machines such as ring spinning, ring doubling and twisting frames.

In the production of such endless flexible transmission means as spindle tapes it is necessary to unite the ends of an appropriate length of the narrow woven fabric from which they are made and it is of course desirable to be able as occasion demands to prepare the endless bands or tapes from a roll or stock of material. This has been effected hitherto with tapes formed for example from natural or regenerated cellulose fibers or from spun fiber yarn or continuous filament yarn of synthetic thermoplastic material such as nylon by bonding the ends of a length of tape by a fusion process e.g. by means of heat and pressure applied from heated platens to the overlapping ends or abutting ends of the length of material using if desired an intermediate strip of polymeric material inserted between the heated platens.

In order to improve the wear resistance of spindle tapes particularly for use at high spindle speeds e.g. of about 13,000 to 15,000 revolutions per minute or higher the fabric has been impregnated with emulsions of resinous material. It was found however that because of the difficulties encountered in obtaining a satisfactory bond between the ends of the resin-emulsion impregnated fabric it was not possible to prepare from stock an endless belt as required. It was not practical to supply the treated tape in rolls but fabric lengths for the tapes had to be impregnated by hand leaving the ends free of impregnant so that they could be suitably bonded together e.g. by fusion process with an inserted strip of polymer.

It is an object of the invention to provide an impregnated tape which can be supplied in bulk form, e.g. in rolls, from which any desired length can be cut and such length made into an endless tape by bonding the ends in a simple manner.

According to the present invention there is provided a length of flexible fabric suitable for use as spindle tape and which is woven from fibers or filaments of natural or regenerated cellulose or nylon or mixtures thereof or from yarns which are partly of cotton and partly of polyethylene terephthalate, the fabric being impregnated throughout with an acrylic resin and a nylon resin.

Further according to the present invention there is provided a method for the production of a flexible fabric suitable for use as spindle tape and which is woven from fibers or filaments of natural or regenerated cellulose or nylon or mixtures thereof or from yarns which are partly of cotton and partly of polyethylene terephthalate, the method comprising applying to the fabric an acrylic resin and a nylon resin.

Preferably the resins are applied in solution in one or more organic solvents, the solvents being without significant deleterious effect on the fibers, filaments or yarns of the fabric, and the fabric being subsequently caused or allowed to dry.

The nylon resins which are soluble in organic solvents are, in general, those with low melting points, that is below about 200° C, as distinguished from the usual extrusion grades which have higher melting points. The term "acrylic resin" is used in the specification (and generally) to mean a polymeric resinous material containing at least one constituent having an acrylic grouping on its molecule.

Suitably the acrylic resin is a homopolymer or a copolymer of an acrylic ester of an alcohol of three to eight carbon atoms, such as butyl acrylate. The copolymers include copolymers of such alkyl acrylates with vinyl esters or ethers. The organic solvent employed to obtain the impregnating solution is preferably a lower alkyl alcohol e.g. methyl or ethyl alcohol. The nylon of low melting point is conveniently one having an intrinsic viscosity in the range 0.9 to 1.1 and is one which is capable of being dissolved in a lower alkyl alcohol. Preferably the fabric is impregnated with a greater amount of acrylic resin than nylon resin.

The amount of acrylic resin used is preferably between 5 and 10 percent by weight of the total impregnating solution, that is the acrylic resin solution and the nylon resin solution; and the amount of nylon resin between 1 and 3 percent by weight of the total impregnating solution. A suitable proportion of nylon resin to acrylic resin is approximately 1 part by weight of the former to 3 parts by weight of the latter.

Where a spindle tape consists of or contains nylon this is generally used in the form of spun yarn since it has hitherto been found that the frictional properties of the transmission means are better than if a continuous filament was used. However, where the tape material has been impregnated in accordance with the present invention it has now been surprisingly found that the tapes made from such impregnated continuous filament yarn have very satisfactory frictional properties. The use of tapes from continuous filament yarn is particularly advantageous in conditions where felting is likely to occur that is to say, where the atmosphere contains substantial amount of fly, fluff, lint and the like which can accumulate on the transmission means.

The blends of cotton and polyethylene terephthalate from which the tapes are woven may contain from 50 to 75 percent by weight of polyethylene terephthalate with the remainder cotton. A preferred blend contains about 65 percent by weight polyethylene terephthalate.

Specific examples of how the invention may be carried into practice are as follows, it being understood that these are not to be construed in a limiting sense.

EXAMPLE A

A particularly suitable impregnating composition for use in accordance with the invention comprises 500 cc of methylated spirit, 10 cc of water, 42 grams of acrylic resin ('-'Acronal") 500 L, 14 grams "Maranyl" nylon polymer (Type DA or C109). "Maranyl" is the Registered Trade Mark of I.C.I. Ltd.

"Maranyl" type DA is a compound nylon being a copolymer of types 66, 610 and 6 nylons and completely soluble in alcohols and phenols. "Maranyl" type C109 is a compounded nylon consisting entirely of type 66 nylon modified to be soluble in alcohols and phenols.

"Acronal 500 L" is a copolymer of butyl acrylate with vinyl acetate in solution in ethyl acetate of approximately 40 percent solids content. "Acronal" is the Registered Trade Mark of Badische Anilin and Sodafabriken A.G.

The small proportion of water used in the composition acts as a plasticizer for the nylon polymer.

EXAMPLE B

The composition of example A was prepared utilizing 1,000 cc of methyl alcohol instead of 500 cc as in example A.

In preparing the solutions of examples A and B, the alcohol, water and the low melting nylon are mixed and heated, under reflux, to the boiling point until the polymer is dissolved, usually requiring several hours. The acrylic resin solution is then added and a suitable dyestuff may be added if desired.

Endless tapes were formed from the following materials all of which gave extremely satisfactory results from the point of view of bond strength. I. A cotton tape of ⅝ inch width was formed from a warp of 66 ends of 30s/4 (R 78.8 TEX/4) Egyptian cotton with a weft of 32 picks to the inch 16s/2 (R 73.8 TEX/2) American cotton. II. A ⅝ inch tape was formed from staple fiber nylon wherein the warp consisted of 39 ends of 20s/3 (R 88.2 TEX/3) staple nylon with 45 picks to the inch in the weft of 20s/3 (R 88.2 TEX/3) staple nylon. III. A third type consisted of a cotton/nylon mixture, with 33 to 40 percent cotton, and was particularly suitable for high spindle speeds. This tape also of ⅝ inch width had 39 warp ends of 20s/3 (R 88.2 TEX/3) nylon/cotton blend and 45 picks to the inch of 20s/3 (R 88.2 TEX/3) nylon/cotton blend. IV. The fourth tape was ⅝ inch in width and was formed from a warp of 39 ends of 12s/2 (R 98.4 TEX/2) viscose rayon with a weft of 40 picks of 12s/2 (R 98.4 TEX/2) viscose rayon. All of the above fabrics had a 2/2V twill weave. V. The fifth tape of continuous filament nylon also ⅝ inch in width had 60 warp ends of 210 denier/3 (R 70.0 TEX/3) continuous nylon filament and 36 picks to the inch weft also of 210 denier/3 (R 70.0 TEX/3) nylon filament. The weave for this fifth tape was 2/2V broken twill. VI. A fabric ⅝ inch wide was woven from 65 percent Dacron-35 percent cotton blend spun yarn. There were 39 warp ends and 41 weft picks of 20s/3 (R.88-2 TEX/3 ). The weave was 2/2V twill. VII. Another fabric of the same width was woven from a 66⅔ percent Terylene-33⅓ percent cotton blend spun yarn. The structure was identical to No. VI except that there were 45 weft picks.

Tapes I–IV, VI and VII were impregnated with the more concentrated impregnating composition example A previously mentioned. Tape V was impregnated with the half-strength impregnating composition identified as example B.

In producing the impregnated tape the impregnating solution is prepared in a separate heated tank and then transferred into a container where it is kept warm. i.e. 40° to 50°C, by means of an electric hot plate. Alternatively a thermostatically controlled electric immersion heater may be dipped into the solution to keep it warm. A number of tapes are drawn from supply rolls through the impregnating solution and are then passed through squeezing rollers to extract the surplus of impregnating solution. Alternatively, the surplus solution may be removed by a wiper. The tapes then passed through a drying trough where they are dried by means of air heated to 80° to 90°C. supplied by a blower. The speed of passage of the tape through the impregnating solution is approximately 65 inches per minute and the tape is exposed to the cold air stream for approximately 3 or 4 minutes.

While the invention has been described with reference to certain examples, they are to be considered illustrative rather than limiting and it is intended to cover all modifications and embodiments within the scope of the claims.

It is claimed:

1. A spindle tape the ends of which can be fused together under heat and pressure; the fabric of which consists essentially of a length of flexible fabric which is woven from fibers or filaments of natural or regenerated cellulose or nylon or mixtures thereof or from yarns which are partly of cotton and partly of polyethylene terephthalate, the fabric being impregnated with an acrylic resin and a nylon resin.

2. The tape set forth in claim 1 wherein said acrylic resin and nylon resin are in a solution comprising as a solvent a lower alkyl alcohol and the acrylic resin is in proportion of 3 parts by weight acrylate to 1 part by weight nylon.

3. The tape set forth in claim 1 wherein said acrylic resin and nylon resin are in a solution which contains 5–10 percent by weight of a copolymer of alkyl acrylic resin with a vinyl compound selected from the group consisting of vinyl esters and vinyl ethers and 1–3 percent by weight of nylon.

4. The tape set forth in claim 3 wherein said copolymer is a copolymer of butyl acrylate and vinyl acetate.

5. The tape set forth in claim 1 wherein said yarns are a blend of natural cellulose and spun nylon.

6. The tape set forth in claim 1 wherein said yarns are monofilament nylon.

7. The tape set forth in claim 1 wherein said yarns are a blend of cotton and polyethylene terephthalate.

8. The fabric of claim 1 formed into an endless spindle tape, the fabric ends having been fused together under heat and pressure.

9. The tape of claim 8 including a strip of nylon interposed between the tape ends.

* * * * *